United States Patent [19]

Carlson et al.

[11] 3,832,801

[45] Sept. 3, 1974

[54] FERTILE INTERSPECIFIC HYBRIDIZATION CELL FUSION FOR HIGHER PLANTS

[75] Inventors: Peter S. Carlson, Islip; Harold H. Smith, Shoreham; Rosemarie D. Dearing, Copiague, all of N.Y.

[73] Assignee: The United States of America as represented by the United States Atomic Energy Commission, Washington, D.C.

[22] Filed: May 8, 1973

[21] Appl. No.: 358,447

[52] U.S. Cl. ................................................. 47/58
[51] Int. Cl. ........................................... A01g 31/00
[58] Field of Search ...................................... 47/58

[56] References Cited
FOREIGN PATENTS OR APPLICATIONS
7,101,939   8/1971   Netherlands

OTHER PUBLICATIONS

Clonal Variation..., Arya et al., Amer. Journ. of Bot., Vol. 49, April 1962, pp. 368–372 relied on, in GP 330.

*Primary Examiner*—Robert E. Bagwill
*Attorney, Agent, or Firm*—John A. Horan; Leonard Belkin

[57] ABSTRACT

Interspecific plant hybrids are produced by parasexual procedures. Protoplasts of separate plant species are isolated, fused, and induced to regenerate into plants. The somatic hybrids are recovered from a mixed population of parental and fused protoplasts by a selective screening method that relies on differential growth of the hybrid on defined culture media. The biochemical and morphological characteristics of the somatically produced hybrid are identical to those of the sexually produced amphiploid.

3 Claims, 8 Drawing Figures

FERTILE INTERSPECIFIC HYBRIDIZATION CELL FUSION FOR HIGHER PLANTS

BACKGROUND OF THE INVENTION

The invention described herein was made in the course of, or under a contract with the U.S. Atomic Energy Commission.

Workers in the biological sciences have developed several techniques for the production of plant hybrids, that is, plants which combine the characteristics of more than one species of plant.

One well known technique involves the transfer of pollen from one species to the female receptacle of another species and cultivating the resultant product to learn the nature of the hybrid which has been produced. This method, involving gametes and fertilization is time-consuming and furthermore quite often is not even possible because in many instances such crosspollination will not work or can not be attained due to the presence of natural barriers. Another drawback of such method is that interspecific hybrids so produced are usually sterile, necessitating crosspollination to produce each new generation.

Techniques are available in some instances to double artificially the chromosomes and sometimes this occurs spontaneously, forming the fertile amphiploid. However, this can not be accomplished in all cases and when artificially produced the procedure is usually complicated and time consuming.

Another known technique involves combining somatic cells, usually diploids, by fusion. A major and heretofore insurmountable problem associated with this approach is the inability to separate the somatic hybrids from the species in the cell medium. Until differentiation takes place, and quite frequently not until it is virtually completed, is it possible to identify the somatic hybrids. In view of the large number of cells involved this difficulty renders it virtually impossible to produce interspecific hybrids on any significant scale.

SUMMARY OF THE INVENTION

The present invention overcomes many of the problems associated heretofore with the formation of somatic hybrids by making it possible to separate the somatic hybrids from the remaining cells and thus effectively to culture such hybrids.

In accordance with a preferred embodiment of this invention, somatic cells of first and second species of plant to be used to form a hybrid are isolated and then fused together to form a mixed population of fused cells, the mixed population is placed on a culture medium which will not support the growth of cells of the first and second species but will support the growth of hybrid colonies under suitable conditions for a period of time sufficient to form hybrid cell calli, and then growing said calli under conditions that promote differentiation to form hybrid whole plants.

By selecting a culture medium for the growth of the hybrid cell colonies which is inadequate for species cell growth, but not for the hybrid cells, it is possible to separate quickly and efficiently the hybrids from the mixed population.

It is thus a principal object of this invention to produce, culture and separate hybrid colonies from cells of the species simply and efficiently.

Other objects and advantages of this invention will hereinafter become obvious from the following description of a preferred embodiment of this invention.

DESCRIPTION OF THE PREFERRED EMBODIMENT

Figure 1:
FIGS. 1 – 8 are reproductions of photographs showing various stages in the development of one isolate.
Figures 2, 3:
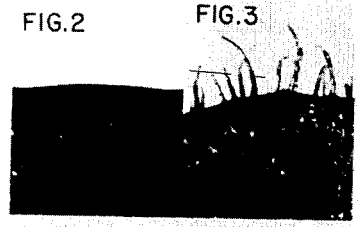
Figures 4, 5:
Figures 7, 8:
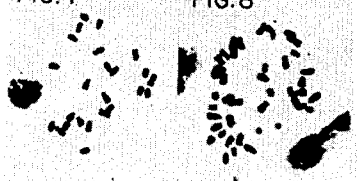

Somatic cells from the two parental plant species are selected and prepared for fusion. For example, leaf cells may be taken from the plants and the walls removed by exposing the leaves to an appropriate solution of enzymes under suitable conditions in order to break down the leaf cell wall and expose the cell membrane. The protoplasts from the separate species are then harvested, and mixed populations of the protoplasts in an approximate 1:1 ratio are then suspended in a regenerative medium in which all cells from the separate species fail to grow but the fused cells will grow. Only the cells containing the genetic information of both parental species are able thus to regenerate into calli. Regenerated calli are then removed and as a further selective step may be cultured on media solidified with agar but containing in the example described below, no hormones.

Recovered calli having formed rudimentary shoots and leaves in culture, but lacking roots under the particular culture conditions used, may then be grafted onto the freshly cut stem surface of young plants of either parental species and propagated to obtain further differentiation. Under some circumstances grafting would be unnecessary.

EXAMPLE

The parental species used were *Nicotiana glauca* ($2n = 24$) and *N. langsdorffi* ($2n = 18$). The $F_1$ tumorous hybrid of these species has been produced by crosspollination, and the amphiploid ($2n = 42$) produced by doubling the chromosomes of the $F_1$.

Protoplasts of the parental species were isolated from leaf mesophyll cells by stripping the lower epidermis from sterilized, young, expanding leaves. Stripped leaf pieces were placed in an enzyme solution consisting of 4 percent cellulase (Onozuka SS, All Japan Biochemicals Co. Ltd.), 0.4 percent macerozyme (All Japan Biochemicals Co. Ltd.), and 0.6 M of sucrose at pH 5.7. Flasks containing the leaf pieces in the enzyme solution were evacuated briefly, then returned to standard atmospheric pressure to facilitate penetration of the enzyme solution into the intercellular spaces. These flasks were incubated for 4–6 hr at 37°, after which the protoplasts were harvested by low-speed centrifugation ($<100 \times g$).

Experimental conditions and regeneration medium used for protoplast culture were exactly those described by Nagata and Takebe in (1971) Planta 99, 12–20. Protoplast density was always greater than $5 \times 10^3$ protoplasts per ml. In the Nagata and Takebe medium, protoplasts of *N. glauca* and *N. langsdorffi* will generate a cell wall and occasionally go through one division cycle, but protoplasts of these two species were never observed to regenerate into a callus in this regenerative medium. It is found that protoplasts of the amphiloid hybrid react similarly; however, about 0.01% of the protoplasts continued to divide and give rise to a callus mass of cells. The different growth characteristics of protoplasts from the two parental species and from the amphiploid hybrid on Nagata and Takebe medium therefore constitute a selection method with which to recover preferentially hybrid individuals from a mixed population of protoplasts. Since protoplasts from both parental species are unable to grow on the Nagata and Takebe medium, the only protoplasts capable of forming viable colonies will be those with a hybrid genetic constitution.

Mixed population of protoplasts of *N. glauca* and *N. langsdorffi* in an approximate 1:1 ratio were stimulated to fuse by their suspension in 0.25 M of $NaNO_3$ for 30 min, and then pelleted by low-speed centrifugation. This pellet was then resuspended in the regeneration medium and plated in petri dishes. After the fusion procedure, the population consisted of protoplasts of both parental types and fused clumps of protoplasts involving various numbers of cells. About 25 percent of the protoplasts were involved in a fusion event. On the regeneration medium, however, only the cells containing the genetic information of both parental species were able to regenerate into calli. Regenerated calli were removed from the culture medium and placed on the medium of Linsmaier, E. M. & Skoog, F. (1965) Physiol. Plant, 18 100–127, which was solidified with agar and contained no hormones. This constituted a further selective step, since tissue from neither parental species is able to grow on a medium without added hormones, while the amphiploid hybrid grows vigorously without exogenous hormones present, as described by Schaeffer, G. W. & Smith, H. H. in (1963) Plant Physiol. 38, 291–297.

Recovered calli formed rudimentary shoots and leaves in culture, but failed to form roots. In order to obtain further differentiation of presumed hybrid tissue, the regenerated shoots were grafted onto the freshly cut stem surface of young plants of *N. glauca*. The grafts were wrapped with paraffin and were kept under high moisture conditions in the mist propagation section of a greenhouse until the graft had taken and a few leaves had developed.

The chromosomes were prepared from young leaves by the method described in Burns, J. A. (1964) Tobacco Sci. 8, 22–23. Electrophoresis and staining for peroxidase isozymes were as described by Smith et al. in (1967) Amer. J. Bot. 54, 1237–1241, and (1970) J. Hered 61, 203–212.

More than $10^7$ protoplasts of *N. glauca* and $10^7$ protoplasts of *N. langsdorffi* were taken through the fusion procedure and plated on a regeneration medium that permits the growth of only cells containing the genetic information of both parental species, as described. 33 regenerated calli were recovered after 6 weeks and placed on a medium containing no added hormones. All 33 isolates grew vigorously with no exogenous hormone source. This observation provided circumstantial evidence that the recovered calli had a hybrid genetic composition. Several of the recovered calli that were presumed parasexual hybrids were chosen for further tests to confirm their hybrid genetic composition.

The following analysis was completed with three isolates. Photographs in FIGS. 1–8, are presented for only one, although the described characteristics were common to all three.

Morphology of the Tissue in Culture

The characteristic tissue morphology and growth requirements of the somatically produced hybrid were identical to those of the sexually produced hybrid.

Morphology of the Leaf

The morphology of leaves regenerated on the somatically produced hybrid was identical to that of the sexually produced hybrid, and distinct from either parental type (FIG. 1). The leaves of *N. langsdorffi* are sessile, those of *N. glauca* are petiolate, and the hybrid has a leaf of intermediate morphology.

Trichome Characteristics

The leaves of *N. langsdorffi* are densely covered with trichomes, while leaves of *N. glauca* are glabrous without trichomes (12). On leaves of both the somatically and sexually produced hybrid, trichomes were present, but in a much lower density (FIGS. 2–5).

Tumor Formation

Figure 6:

The somatically produced hybrid spontaneously formed tumorous outgrowths on the stem (FIG. 6). Spontaneous tumor formation is a genetically determined trait that is characteristic of the $F_1$ hybrid and amphiploid, but is not found in either parent species, and is not transmitted across a graft union (7).

Chromosome Numbers

A somatic chromosome number of 42 (FIGS. 7 and 8) was determined for the somatically produced hybrid. This is a summation of the diploid somatic numbers of the parental species (24 + 18), and is distinct from a whole ploidy change in either parental type. The sexually produced amphiploid has been shown to contain a chromosome number of 42 (Goodspeed, T. H., 1954, The Gensus Nicotiana, Chromica Botanica, Waltham, Mass.). Although the somatically produced hybrids all demonstrated a chromosome number of 42, deviations from simple addition of the parental chromosome numbers might be expected to occur due to the complexity of the fusion event and divisions after fusion.

Peroxidase Isozynmes

The leaf peroxidase isozymes in the somatically produced hybrid were identical to those of the amphiploid. The isozyme bands of the hybrid are a summation of those found in the parental species.

The characteristics of the somatic hybrid are not due to a chimerial association of cells. Single cells derived from calli of the somatically produced hybrid were regenerated into calli, and their characteristics were analyzed. In every case, the regenerated callus displayed characteristics of hybrid tissue, and was distinct from either parental type. Hence, the characteristics of the somtically produced hybrid are not due to a chimerial association of cells of the parental species. All cells of the somatically produced hybrid contained only one nucleus. The possibility that the somatically produced hybrid was due to contamination by sexually produced amphiploid cells is ruled out by the experimental procedure used.

Further details of the method described hereinabove appear in our paper, Carlson et al., "Parasexual Interspecific Plant Hybridization," Proc. Nat. Acad. Sci., Vol. 69, No. 8, pp. 2292–2294, Aug. 1972.

Summation of this evidence leaves no doubt that the calli and plants recovered from fused cells were of a hybrid genetic constitution corresponding to the sexually produced amphiploid. The somatic hybrid has produced flowers and fertile seed capsules that are identical with the *N. glauca X N. langsdorffi* amphiploid.

What is claimed is:

1. The method for the production of fertile interspecific hybrid plants comprising the steps of:
   a. fusing together to form a mixed population of fused somatic cells of first and second parental species of *N. glauca* and *N. langsdorffi*, respectively;
   b. placing said mixed population in contact with a culture medium which will not support the growth of cells of the first and second species but will support the growth of hybrid colonies for a period of time sufficient to form hybrid cell calli; and
   c. growing said calli under conditions that promote differentiation to form hybrid plants.

2. The method of claim 1 in which differentiation is promoted by grafting calli having rudimentary shoots and leaves in culture onto the cut stem surface of a young plant of either parental species followed by propagation to obtain such further differentiation.

3. The method for the production of fertile interspecific hybrid plants comprising the steps of:
   a. isolating a first cell-strain of the *N. glauca* plant species;
   b. isolating a second cell-strain of the *N. langsdorffi* plant species;
   c. preparing wall-less cells of said first and second cell-strains;
   d. causing some of the wall-less cells of said first and second cell-strain to fuse together to form a mixed population of fused cells;
   e. growing said fused cells in contact with a culture medium lacking in specific culture-medium additives essential to the growth of said first and second cell-strains under conditions suitable for fused cell replication for a period of time sufficient to form cell hybrid colonies from fused hybrid cells;
   f. isolating said cell hybrid colonies; and
   g. growing said cell hybrid colonies under conditions to promote differentiation to form hybrid plants having a ploidy higher than the ploidy of either one of the plant species.

* * * * *